(12) United States Patent
Cai et al.

(10) Patent No.: US 9,327,309 B2
(45) Date of Patent: May 3, 2016

(54) PROCESS FOR RECLAIMING INORGANIC POWDERS FROM POLYMER-BASED COATING COMPOSITIONS

(71) Applicant: GE LIGHTING SOLUTIONS, LLC, East Cleveland, OH (US)

(72) Inventors: Dengke Cai, Mayfield Heights, OH (US); Gary Robert Allen, Chesterland, OH (US); Thomas Clynne, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 257 days.

(21) Appl. No.: 13/949,255

(22) Filed: Jul. 24, 2013

(65) Prior Publication Data

US 2015/0030764 A1    Jan. 29, 2015

(51) Int. Cl.
*B05D 5/12* (2006.01)
*B05C 11/10* (2006.01)
*C09K 11/01* (2006.01)

(52) U.S. Cl.
CPC ............. *B05C 11/1039* (2013.01); *C09K 11/01* (2013.01); *Y02W 30/72* (2015.05)

(58) Field of Classification Search
USPC ........................................................ 427/345
See application file for complete search history.

(56) References Cited

U.S. PATENT DOCUMENTS

| | | | |
|---|---|---|---|
| 5,160,663 A | 11/1992 | Dutta et al. | |
| 5,492,626 A * | 2/1996 | Uenoyama | C09D 7/008 210/651 |
| 6,531,814 B1 | 3/2003 | Jansma | |
| 2003/0160256 A1 | 8/2003 | Durocher et al. | |
| 2004/0190305 A1 | 9/2004 | Arik et al. | |
| 2005/0160637 A1* | 7/2005 | Hesse | G09F 13/20 40/124.5 |
| 2012/0098425 A1 | 4/2012 | Arik et al. | |
| 2013/0026905 A1 | 1/2013 | Du et al. | |

FOREIGN PATENT DOCUMENTS

CN        101307391 A        11/2008

* cited by examiner

*Primary Examiner* — Austin Murata
(74) *Attorney, Agent, or Firm* — GE Global Patent Operation; Peter T. DiMauro

(57) ABSTRACT

Processes for recovering inorganic powder materials from polymer-based coating compositions used to deposit a polymer-based coating. The process includes combining a polymer precursor, first solvent, and inorganic powder material to form a suspension, and applying the suspension to a substrate to form a layer. At least a portion of the suspension that did not adhere to the substrate is then collected. Residual portions of the first solvent and polymer precursor are at least partially removed from this portion of the suspension to yield a crude inorganic powder material comprising a residual portion of the inorganic powder and optionally a partially-cured polymer precursor, the latter of which can be removed by treating the crude inorganic powder material with a second solvent.

18 Claims, 1 Drawing Sheet

PROCESS FOR RECLAIMING INORGANIC POWDERS FROM POLYMER-BASED COATING COMPOSITIONS

BACKGROUND OF THE INVENTION

The present invention generally relates to coating compositions and methods. More particularly, this invention relates to processes for recovering inorganic powder materials from a polymer-based coating composition used to deposit a polymer-based coating containing the inorganic powder material.

Various applications exist for polymeric coatings that contain an inorganic powder material, nonlimiting examples of which include paints and reflective coatings. Phosphor-containing and color conversion coatings for use in lighting applications are other examples under consideration. As known in the art, phosphors exhibit luminescence and are commonly used in fluorescent lamps, phosphor-based light-emitting diodes (LEDs), and various other light-generating units.

Silicone is a notable but nonlimiting example of a commonly used encapsulation material for LED-phosphor integration with LED epitaxial (epi) wafer and die fabrication, and is also commonly applied as a binder for remote phosphor-containing coatings on transparent and translucent substrates, for example, glass enclosures (domes) of LED devices. In the latter example, a phosphor powder is combined with the silicone binder to form a suspension that can be applied to a substrate, for example, using a spray coating or dip coating technique. While having various desirable characteristics, silicone has certain limitations, one of which is that silicone limits the ability to reclaim and recycle an inorganic phosphor powder that is contained in a portion of the suspension that does not adhere to the targeted substrate. In practice, this limitation may result in most of the phosphor powder being lost. This aspect of silicone is undesirable in view of the cost of phosphor materials, particularly if the phosphor powder is made up of rare earth-activated materials.

BRIEF DESCRIPTION OF THE INVENTION

The present invention provides processes for recovering inorganic powder materials from polymer-based coating compositions used to deposit a polymer-based coating containing the inorganic power material. A nonlimiting example of such a process is the recovery of inorganic powder materials following the formation of an inorganic powder-containing coating on a substrate, such as the surface of a glass dome of an LED device.

According to a first aspect of the invention, a process is provided that includes combining at least a polymer precursor, a first solvent, and an inorganic powder material to form a suspension of a polymer-based coating composition. The suspension is applied to a substrate so that a first portion of the suspension adheres to the substrate and forms a layer on the substrate. A second portion of the suspension that did not adhere to the substrate is then collected. The second portion of the suspension comprises residual portions of the first solvent, the inorganic powder material, and the polymer precursor, and optionally further comprises a partially-cured polymer precursor formed from the polymer precursor. The residual portions of the first solvent and the polymer precursor are then at least partially removed to yield a crude inorganic powder material comprising the residual portion of the inorganic powder and any partially-cured polymer precursor. The crude inorganic powder material is then treated with a second solvent in which the optional partially-cured polymer precursor is soluble to dissolve at least a portion of the partially-cured polymer precursor.

According to a second aspect of the invention, a process is provided for recovering an inorganic powder material from a suspension, a portion of which was applied to a substrate to form an inorganic powder-containing coating on the substrate. The process includes combining at least a polymer precursor, a first solvent, and the inorganic powder material to form a suspension of a polymer-based coating composition. The suspension is applied to a substrate so that a first portion of the suspension adheres to the substrate and forms a layer on the substrate. The layer is treated to remove the first solvent, cure the polymer precursor, and form therefrom a coating comprising particles of the inorganic powder material dispersed in a polymer binder formed by curing the polymer precursor. Both the polymer binder and the substrate are substantially insoluble in the first solvent. A second portion of the suspension that did not adhere to the substrate is collected, wherein the second portion of the suspension comprises residual portions of the first solvent, the inorganic powder material, and the polymer precursor, and further comprises a partially-cured polymer precursor formed from the polymer precursor undergoing polymerization during the applying step. The residual portions of the first solvent and the polymer precursor are then at least partially removed to yield a crude inorganic powder material comprising the residual portion of the inorganic powder and the partially-cured polymer precursor. The crude inorganic powder material is then treated with a second solvent in which the partially-cured polymer precursor is soluble to dissolve at least a portion of the partially-cured polymer precursor.

According to a third aspect of the invention, a process is provided for fabricating a component of a light-emitting device. The process includes combining at least a polymer precursor, a first solvent, and an inorganic powder material to form a suspension of a polymer-based coating composition. The suspension is applied to a substrate of the component so that a first portion of the suspension adheres to the substrate and forms a layer on the substrate. The layer is then treated to remove the first solvent, cure the polymer precursor, and form therefrom a coating on a surface of the substrate. The coating comprises particles of the inorganic powder material dispersed in a polymer binder formed by curing the polymer precursor. Both the polymer binder and the substrate are substantially insoluble in the first solvent. A second portion of the suspension that did not adhere to the substrate is then collected, wherein the second portion comprises residual portions of the first solvent, the inorganic powder material, and the polymer precursor, and further comprises a partially-cured polymer precursor formed from the polymer precursor undergoing polymerization during the applying step. The residual portions of the first solvent and the polymer precursor are then at least partially removed to yield a crude inorganic powder material comprising the residual portion of the inorganic powder and the partially-cured polymer precursor. The crude inorganic powder material is then treated with a second solvent in which the partially-cured polymer precursor is soluble to dissolve at least a portion of the partially-cured polymer precursor, after which the second solvent and the partially-cured polymer precursor dissolved therein are removed from the crude inorganic powder material. The steps of treating with the second solvent and removing the second solvent can be repeated as may be necessary to yield essentially the residual portion of the inorganic powder.

A technical effect of the invention is the ability to recover and recycle inorganic powder materials, including but not limited to rare earth-activated phosphor particles, that were in a suspension applied to a substrate, but within a portion of the suspension that did not adhere to the substrate. In so doing, the invention has the potential to reduce costs associated with the use of rare earth-activated phosphor particles in lighting systems, as well as a wide variety of other coating applications.

Other aspects and advantages of this invention will be better appreciated from the following detailed description.

DETAILED DESCRIPTION OF THE INVENTION

Figure 1:
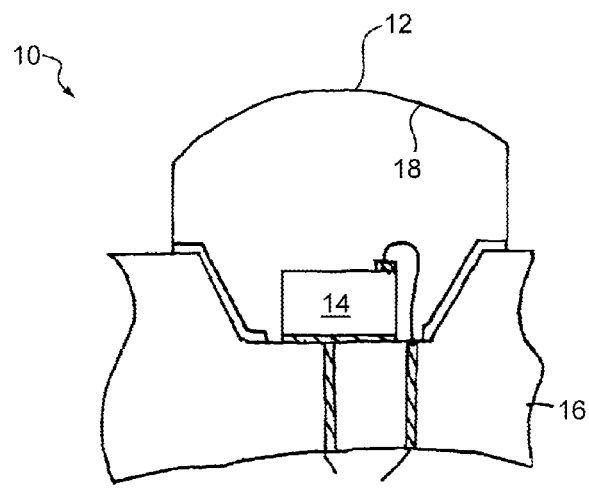
FIG. 1 represents a fragmentary cross-sectional view of an LED device enclosed by a glass dome, and an inorganic powder-containing coating on an inner surface of the dome.

FIG. 1 represents a portion of an LED device 10, as an example, an LED array, of a type that comprises a glass dome 12 that serves as an optically transparent envelope enclosing an LED chip 14 mounted on a carrier 16. Glass is commonly used as the material for the dome 12, though other materials can be used including plastics. As represented in FIG. 1, the inner surface of the dome 12 may be provided with a coating 18, for example, a coating that contains a phosphor composition, in which case light emitted by the LED chip 14 is absorbed by the phosphor composition within the coating 18, resulting in excitation of the phosphor composition to produce visible light that is emitted through the dome 12. As an alternative, the LED chip 14 may be encapsulated on the carrier 14 with a coating (not shown), and such a coating may optionally contain a phosphor composition for embodiments in which LED-phosphor integration with LED epitaxial (epi) wafer or die fabrication is desired.

Phosphor compositions of types that would be used in the LED device 10 typically comprise a host material doped with an activator that, e.g., prolongs the emission time. A wide variety of phosphor compositions are known, notable examples of which include inorganic rare earth and transition metal compounds doped with one or more rare earth activators. As a nonlimiting example, phosphor-containing coatings have been employed that contain a controlled mixture of europium-activated barium magnesium aluminate phosphor ($BaMgAl_{10}O_{17}:Eu^{2+}$; BAM) as a blue-emitting phosphor, cerium- and terbium-coactivated lanthanum phosphate phosphor ($LaPO_4:Ce^{3+},Tb^{3+}$; LAP) as a green-emitting phosphor, and europium-activated yttrium oxide phosphor ($Y_2O_3:Eu^{3+}$; YOE) as a red-emitting phosphor, mixed in appropriate ratios. Still other examples include complex fluorides such as $K_2MF_6:Mn^{4+}$, where M represents Si, Ge, Sn, and/or Ti. A particular example is Mn-doped potassium fluorosilicate (PFS; $K_2[SiF_6]:Mn^{4+}$), which is a narrow band red emitter phosphor.

The LED device 10 shown in FIG. 1 is useful as a nonlimiting schematic representation of a type of component with which the present invention can be practiced. As such, further references will be made to the LED device 10 in the following discussion of the invention, though it should be understood that the invention is not limited to the particular configuration of the device 10 or to light-generating devices in general. In particular, the invention is envisioned as being applicable to a wide variety of components and their substrates on which an inorganic powder-containing coating may be applied, including other applications in which a phosphor-containing composition is to be applied to a substrate, for example, in LED and fluorescent lighting technologies, as well as other coating applications, including but not limited to coatings that are optically reflective or have optical filtering properties. More generally, the LED device 10 (or other component) may incorporate a coating comprising an inorganic powder which is a non-phosphor composition. Nonlimiting examples of inorganic powders that are non-phosphor compositions include rare earth compounds other than phosphors, such as neodymia ($Nd_2O_3$) in the form of Nd-doped glass or crystal used for color filtering.

In certain applications it may be desirable to form such coatings by applying a coating composition in which the inorganic powder is suspended in a polymer precursor, which as used herein is intended to refer to monomer and oligomer compositions that can undergo cross-linking (curing) to form a polymer binder. With such an approach, the inorganic powder can be dispersed in a polymer precursor to form a suspension, which is then applied to the intended substrate and subjected to a curing treatment to form a polymer-based coating in which the inorganic powder is dispersed in a polymer binder.

While various techniques are capable of applying the suspension to an intended substrate, two notable examples are spraying and dipping techniques, both of which have been employed in the lighting industry. These deposition techniques may result in some but not all of the suspension being coated onto the intended substrate, with the result that at least a portion and potentially a majority of the suspension is often not deposited. Particularly in cases where the inorganic powder is relatively expensive, for example, as a result of containing a rare earth metal in elemental or compound form, for example, $Nd_2O_3$, the loss of the inorganic powder in the excess suspension can have a significant impact on the cost of producing the end product.

Figure 2:
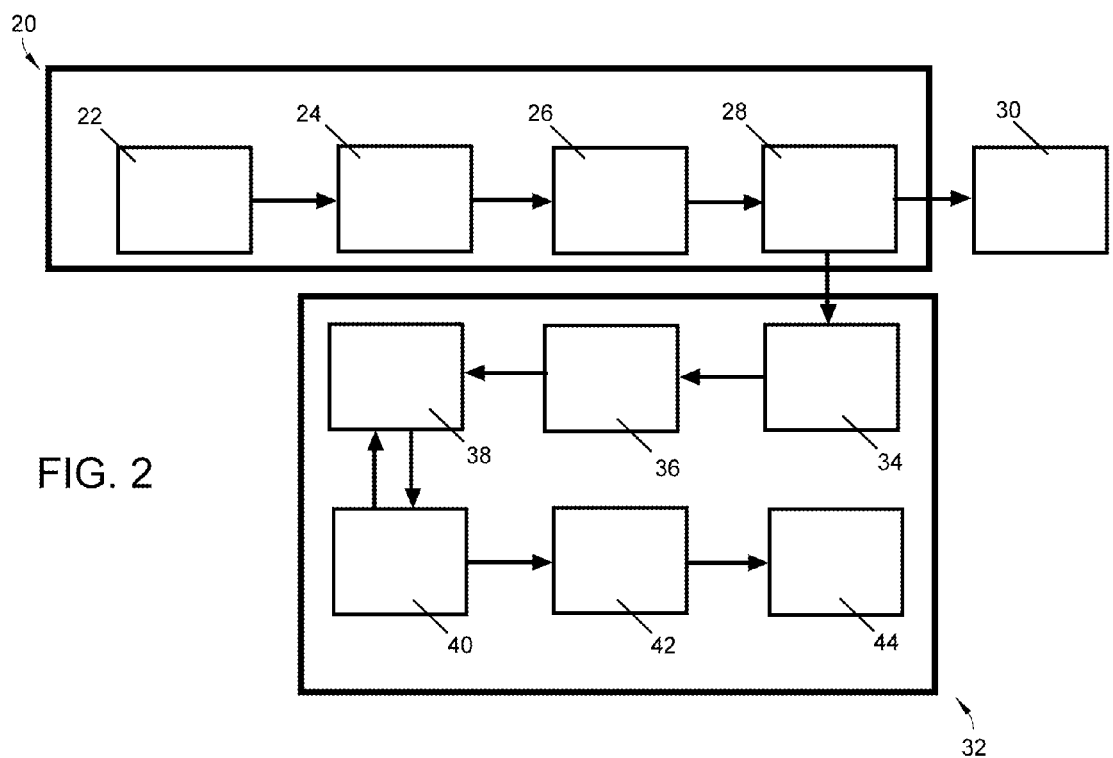
FIG. 2 represents a flow diagram of processes that can be employed to recover inorganic phosphor particles from a suspension that contains a partially cured binder and/or uncured precursor thereof.

As a solution, FIG. 2 represents a coating process 20 by which a coating composition in the form of a suspension is formed (block 24) by dispersing an inorganic powder in a polymer precursor of the desired polymer binder for the final coating (block 30). Nonlimiting examples of polymer binders for use with the invention include thermoplastics such as polyethylene (PE), poly(methyl methacrylate) (PMMA), polyurethane (PU), polycarbonate (PC), and fluoropolymers. Non-limiting examples of precursors of such polymer binders may include shorter-chain polymers or oligomers of any of the foregoing thermoplastics, or may include monomeric precursors of the foregoing thermoplastics such as methyl methacrylate, urethane, bisphenol, and various monomers and oligomers of fluoropolymers. According to a preferred aspect of the invention, the precursor can be dissolved in a non-ionic or low-polarity solvent (block 22), referred to herein as "Solvent A." Suitable solvents for use as Solvent A are those in which the binder of the final coating and the substrate on which the suspension was applied are substantially insoluble, with the desired effect of avoiding detrimental degradation of the optical and/or physical properties of the binder and substrate relative to their intended functions within a light-emitting device, for example, an LED. Particularly desirable solvents for use as Solvent A include water, alcohol, isopropyl alcohol (IPA), acetone, etc., that will not dissolve and preferably will not attack the binder of the final coating or the substrate on which the suspension was applied to form the coating. The above-noted examples of binders are substantially insoluble in at least one solvent in which their respective small-chain precursors (oligomers of, for example, ethylene, methyl methacrylate, urethane, carbonate, and various oligomers of fluoropolymers) can be dissolved, for example, in water, alcohol, acetone, or IPA, to produce a suspension that will not dissolve the cured binder nor attack a variety of substrate materials, for example, glass, metals, PC, etc. Furthermore, such suspensions can be applied to a substrate by spraying, dipping, or other technique.

During the process of applying the suspension to the substrate (block 26), a portion of the suspension adheres to the substrate to form a layer on the substrate. The applied layer can then undergo a treatment to cure the precursor and form therefrom the binder in which particles of the inorganic powder are dispersed. As nonlimiting examples, the precursor can undergo cross-linking through energy activation, for example, thermal baking, UV radiation, infrared (IR) radiation, etc. During this process, Solvent A and other possible constituents of the suspension, for example, surfactants, dispersants, thickening agents, etc., can be volatilized or otherwise removed. Following curing of the binder, additional amounts of the suspension can be applied and processed to produce a multilayered polymer-based coating having a desired thickness (block 28). By appropriately selecting the binder and Solvent A as noted above, any subsequent application of the suspension will not dissolve the cured binder within a previously-formed layer of the coating.

As a result of the suspension being applied to the substrate by spraying, dipping, etc., it is desirable to collect the excess suspension that did not adhere or otherwise deposit onto the substrate (block 34). This residual suspension, predominantly comprising Solvent A, inorganic powder, and binder precursor, is preferably collected and recycled through a recycling process 32 diagrammatically represented in FIG. 2. The recycling process 32 is intended to reclaim the inorganic powder in a "clean" form (block 44). In addition to the small-chain precursor, the suspension is likely to contain a partially-cured (partially cross-linked), larger-chain precursor/binder as a result of the likelihood that polymerization of the precursor initiated during the application process. Consequently, FIG. 2 represents a multistep recycling process 32 for reclaiming the inorganic powder.

As a first reclamation step shown in FIG. 2, the collected suspension preferably undergoes filtration (block 36) to remove at least a portion of Solvent A and the precursor dissolved therein. The filtration step may comprise any suitable techniques, nonlimiting examples of which include filtration/heating and vacuuming filtration. The result of the filtration step is likely to yield what may be referred to as a crude inorganic powder material, which is likely to predominantly contain the inorganic powder and partially-cured precursor/binder. Because the binder is intentionally insoluble in Solvent A, a different solvent, referred to herein as "Solvent B," is employed to dissolve the partially-cured precursor/binder (block 38), yielding a suspension from which the partially-cured precursor/binder and Solvent B can be at least partially removed during a subsequent step (block 40). Solvent B has a polarity similar to the binder to enable the partially-cured precursor/binder to be dissolved and removed from the suspension by filtration. For example, in the case of polyethylene, poly(methyl methacrylate), polyurethane, or polycarbonate used as the binder, suitable solvents for Solvent B may include toluene, benzene, xylene, dichlorobenzene, and their mixtures. Because the crude inorganic powder material is entirely separate from the inorganic powder-containing coating (block 30), there is no concern for whether Solvent B (block 38) would attack the substrate or not.

As noted above, the suspension formed in block 38 can undergo filtration in block 40 to at least partially remove Solvent B and the partially-cured precursor/binder dissolved therein. Because this suspension may yet contain residual partially-cured precursor/binder, FIG. 2 represents that the suspension can be subjected to additional treatments with additional amounts of Solvent B to dissolve and remove residual partially-cured precursor/binder from the suspension. FIG. 2 further shows that additional treatments with Solvent A can also be performed on the resulting powder-laden material (block 42) to yield an essentially pure inorganic powder (block 44), in other words, the inorganic powder may be rendered substantially free of the precursor, the partially-cured precursor/binder, and Solvents A and B.

In view of the above, it should be appreciated that the process overcomes limitations associated with prior inorganic-containing polymer coatings, whose binders significantly complicate if not prevent recovery of inorganic powders suspended in coating compositions used to form the coatings. This aspect is advantageous in view of the cost of certain inorganic powders, and particularly phosphor powders made up of rare earth-activated materials. As such, the coating and recycling processes described above can form part of a process for fabricating a variety of components, for example, the LED device 10 of FIG. 1, in which case the substrate to which the suspension is applied may be, but is not limited to, the glass dome 12 and/or carrier 16 in FIG. 1.

While the invention has been described in terms of specific embodiments, it is apparent that other forms could be adopted by one skilled in the art. Therefore, the scope of the invention is to be limited only by the following claims.

The invention claimed is:

1. A process of recovering an inorganic powder material from a polymer-based coating composition, the process comprising:
   combining at least a polymer precursor, a first solvent, and the inorganic powder material to form a suspension of the polymer-based coating composition;
   applying the suspension to a substrate so that a first portion of the suspension adheres to the substrate and forms a layer on the substrate;
   collecting a second portion of the suspension that did not adhere to the substrate, the second portion of the suspension comprising residual portions of each the first solvent, the inorganic powder material, and the polymer precursor and optionally further comprising a partially-cured polymer precursor formed from the polymer precursor;
   removing at least some of the residual portions of each the first solvent and the polymer precursor to yield a crude inorganic powder material comprising the residual portion of each the inorganic powder material and any partially-cured polymer precursor; and
   treating the crude inorganic powder material with a second solvent in which the partially-cured polymer precursor is soluble to dissolve at least a portion of any partially-cured polymer precursor;
   wherein the process further comprises at least partially removing the second solvent and any partially-cured polymer precursor dissolved therein from the crude inorganic powder material; and
   wherein the process yields the residual portion of the inorganic powder material substantially free of the polymer precursor and the first and second solvents.

2. The process according to claim 1, wherein the steps of treating with the second solvent and at least partially removing the second solvent are repeated.

3. The process according to claim 1, wherein the inorganic powder material comprises a phosphor material.

4. The process according to claim 3, wherein the phosphor material comprises a rare earth element or a rare earth-containing compound.

5. The process according to claim 1, wherein the inorganic powder material comprises $Nd_2O_3$.

6. The process according to claim 1, wherein the inorganic powder material comprises $K_2MF_6$:$Mn^{4+}$, where M represents Si, Ge, Sn, and/or Ti.

7. A process of recovering an inorganic powder material from a polymer-based coating composition, the process comprising:
  combining at least a polymer precursor, a first solvent, and the inorganic powder material to form a suspension of the polymer-based coating composition;
  applying the suspension to a substrate so that a first portion of the suspension adheres to the substrate and forms a layer on the substrate;
  treating the layer to remove the first solvent, cure the polymer precursor, and form therefrom a coating comprising particles of the inorganic powder material dispersed in a polymer binder formed by curing the polymer precursor, the polymer binder and the substrate being substantially insoluble in the first solvent;
  collecting a second portion of the suspension that did not adhere to the substrate, the second portion of the suspension comprising residual portions of each the first solvent, the inorganic powder material, and the polymer precursor and further comprising a partially-cured polymer precursor formed from the polymer precursor undergoing polymerization during the applying step;
  removing at least some of the residual portions of each the first solvent and the polymer precursor dissolved therein to yield a crude inorganic powder material comprising the residual portion of each the inorganic powder material and the partially-cured polymer precursor; and
  treating the crude inorganic powder material with a second solvent in which the partially-cured polymer precursor is soluble to dissolve at least a portion of the partially-cured polymer precursor material.

8. The process according to claim 7, wherein the polymer binder comprises a thermoplastic selected from one or more of polyethylene, poly(methyl methacrylate), polyurethane, polycarbonate, and fluoropolymers.

9. The process according to claim 7, wherein the first solvent comprises one of more of water, isopropyl alcohol, and acetone.

10. The process according to claim 7, wherein the second solvent comprises one of more of toluene, benzene, xylene, and dichlorobenzene.

11. The process according to claim 7, wherein the inorganic powder material comprises a rare earth element or a rare earth-containing compound.

12. The process according to claim 7, wherein the inorganic powder material comprises $Nd_2O_3$.

13. The process according to claim 7, wherein the inorganic powder material comprises $K_2MF_6$:$Mn^{4+}$, where M represents Si, Ge, Sn, and/or Ti.

14. A process of fabricating a component of a light-emitting device, the process comprising:
  combining at least a polymer precursor, a first solvent, and an inorganic powder material to form a suspension of a polymer-based coating composition;
  applying the suspension to a substrate of the component so that a first portion of the suspension adheres to the substrate and forms a layer on the substrate;
  treating the layer to remove the first solvent, cure the polymer precursor, and form therefrom a coating on a surface of the substrate, the coating comprising particles of the inorganic powder material dispersed in a polymer binder formed by curing the polymer precursor, the polymer binder and the substrate being substantially insoluble in the first solvent;
  collecting a second portion of the suspension that did not adhere to the substrate, the second portion of the suspension comprising residual portions of each the first solvent, the inorganic powder material, and the polymer precursor and further comprising a partially-cured polymer precursor formed from the polymer precursor undergoing polymerization during the applying step;
  removing the residual portions of each the first solvent and the polymer precursor dissolved therein to yield a crude inorganic powder material comprising the residual portion of each the inorganic powder material and the partially-cured polymer precursor;
  treating the crude inorganic powder material with a second solvent in which the partially-cured polymer precursor is soluble to dissolve at least a portion of the partially-cured polymer precursor;
  removing the second solvent and the partially-cured polymer precursor dissolved therein from the crude inorganic powder material; and
  optionally repeating the step of treating with the second solvent and removing the second solvent to yield essentially the residual portion of the inorganic powder material.

15. The process according to claim 14, wherein the polymer binder comprises a thermoplastic selected from one or more of polyethylene, poly(methyl methacrylate), polyurethane, polycarbonate, and fluoropolymers.

16. The process according to claim 14, wherein the inorganic powder material comprises a rare earth element or a rare earth-containing compound.

17. The process according to claim 14, wherein the inorganic powder material comprises $Nd_2O_3$.

18. The process according to claim 14, wherein the inorganic powder material comprises $K_2MF_6$:$Mn^{4+}$, where M represents Si, Ge, Sn, and/or Ti.

* * * * *